US010634358B2

(12) United States Patent
Stoia et al.

(10) Patent No.: US 10,634,358 B2
(45) Date of Patent: Apr. 28, 2020

(54) SYSTEM AND METHOD FOR IGNITING LIQUID FUEL IN A GAS TURBINE COMBUSTOR

(71) Applicant: General Electric Company, Schenectady, NY (US)

(72) Inventors: Lucas John Stoia, Taylors, SC (US); Mark William Pinson, Greer, SC (US); Geoffrey David Myers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 15/625,077

(22) Filed: Jun. 16, 2017

(65) Prior Publication Data

US 2018/0363910 A1 Dec. 20, 2018

(51) Int. Cl.
| | |
|---|---|
| *F23R 3/36* | (2006.01) |
| *F02C 7/264* | (2006.01) |
| *F02C 3/04* | (2006.01) |
| *F23R 3/20* | (2006.01) |
| *F02C 9/26* | (2006.01) |

(Continued)

(52) U.S. Cl.
CPC ............. *F23R 3/36* (2013.01); *F02C 3/04* (2013.01); *F02C 3/30* (2013.01); *F02C 7/232* (2013.01); *F02C 7/264* (2013.01); *F02C 9/26* (2013.01); *F02C 9/263* (2013.01); *F02C 9/32* (2013.01); *F02C 9/34* (2013.01); *F23D 17/002* (2013.01); *F23R 3/20* (2013.01); *F23R 3/28* (2013.01); *F23R 3/34* (2013.01); *F23R 3/343* (2013.01); *F05D 2220/32* (2013.01);

(Continued)

(58) Field of Classification Search
CPC ...... F23R 3/36; F23R 3/20; F23R 3/34; F23R 3/343; F23R 3/29; F23R 3/28; F02C 3/04; F02C 3/30; F02C 7/232; F02C 7/264; F02C 9/263; F02C 9/34; F02C 9/32; F02C 9/26; F23D 17/002; F05D 2220/32; F05D 2260/99; F23N 2027/02
See application file for complete search history.

(56) References Cited

U.S. PATENT DOCUMENTS

| | | |
|---|---|---|
| 2,552,231 A | 1/1947 | Garbett et al. |
| 3,668,869 A | 6/1972 | De Corso |

(Continued)

FOREIGN PATENT DOCUMENTS

WO 2017002076 A1 1/2017

*Primary Examiner* — Steven M Sutherland
(74) *Attorney, Agent, or Firm* — Charlotte C. Wilson; James W. Pemrick

(57) ABSTRACT

A system and method for igniting liquid fuel in a gas turbine combustor is provided. A liquid fuel cartridge, which is located within the head end, is in flow communication with a liquid fuel supply. A gaseous fuel nozzle is located proximate the liquid fuel cartridge and in flow communication with an auxiliary gaseous fuel supply. A controller is in communication with the liquid fuel supply, the auxiliary gaseous fuel supply, and an igniter located proximate or within the head end. The controller is configured to sequentially: initiate a gaseous fuel flow from the auxiliary gaseous fuel supply to the gaseous fuel nozzle; initiate the igniter to combust the gaseous fuel flow; initiate a liquid fuel flow from the liquid fuel supply to the liquid fuel cartridge; and terminate the gaseous fuel flow from the auxiliary gaseous fuel supply.

19 Claims, 6 Drawing Sheets

(51) Int. Cl.
*F02C 7/232* (2006.01)
*F02C 3/30* (2006.01)
*F23D 17/00* (2006.01)
*F02C 9/34* (2006.01)
*F23R 3/34* (2006.01)
*F23R 3/28* (2006.01)
*F02C 9/32* (2006.01)

(52) U.S. Cl.
CPC ...... *F05D 2240/35* (2013.01); *F05D 2260/99* (2013.01); *F23N 2027/02* (2013.01)

(56) References Cited

U.S. PATENT DOCUMENTS

| | | |
|---|---|---|
| 4,833,878 A | 5/1989 | Sood et al. |
| 5,237,812 A | 8/1993 | Mumford |
| 5,408,825 A * | 4/1995 | Foss ............... F23R 3/36 60/39.463 |
| 5,657,632 A | 8/1997 | Foss et al. |
| 6,128,894 A | 10/2000 | Joos et al. |
| 6,201,029 B1 * | 3/2001 | Waycuilis ......... C01B 3/382 252/373 |
| 6,250,065 B1 | 6/2001 | Mandai et al. |
| 6,397,602 B2 | 6/2002 | Vandervort et al. |
| 7,950,238 B2 * | 5/2011 | Iasillo ............... F02C 3/22 60/39.094 |
| 2001/0004827 A1 * | 6/2001 | Vandervort ......... F23R 3/14 60/39.55 |
| 2009/0223226 A1 * | 9/2009 | Koizumi ............ F02C 3/22 60/736 |
| 2009/0272118 A1 * | 11/2009 | Alexander ......... F02C 3/22 60/772 |
| 2010/0220182 A1 * | 9/2010 | Krull ............... F23N 5/082 348/83 |
| 2011/0036092 A1 * | 2/2011 | Lawson ............ F23K 5/002 60/772 |
| 2013/0098056 A1 * | 4/2013 | Zhang .............. F02C 3/305 60/775 |
| 2014/0007585 A1 | 1/2014 | Liu |
| 2014/0260309 A1 * | 9/2014 | Menon ............. F23R 3/36 60/780 |
| 2017/0002742 A1 * | 1/2017 | Jorgensen ......... F23R 3/002 |

* cited by examiner

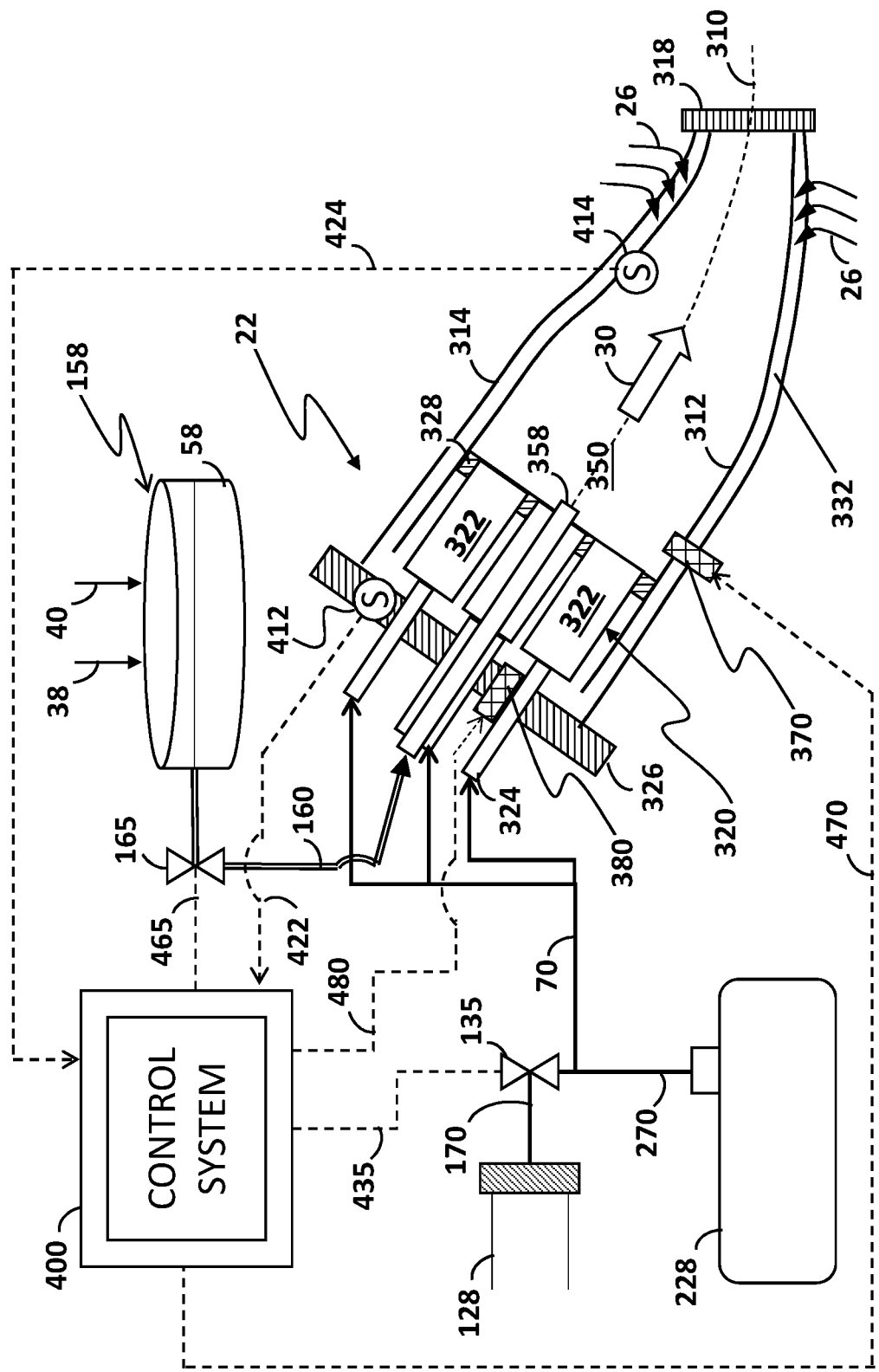
-- FIG. 2 --

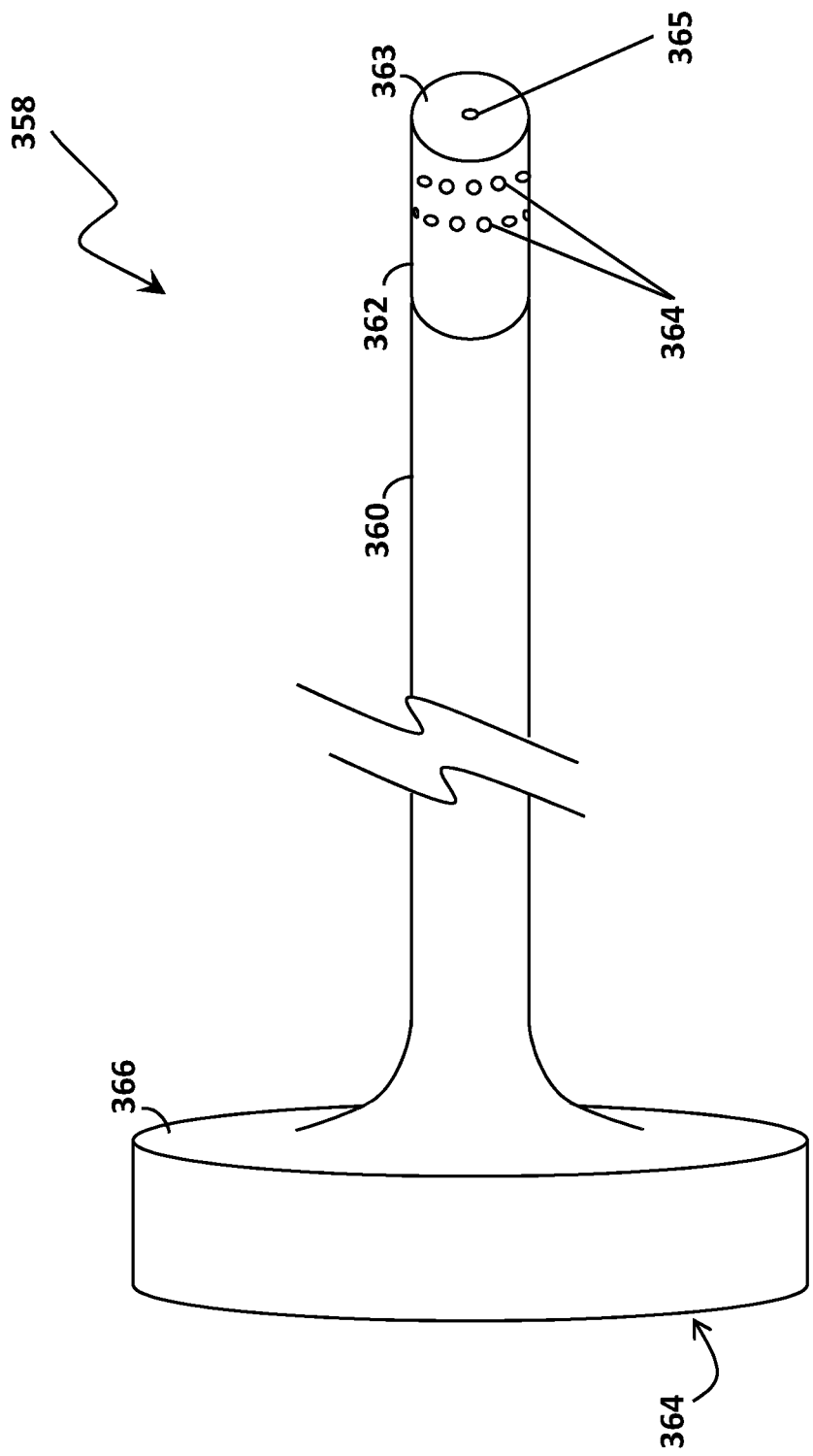
-- FIG. 3 --

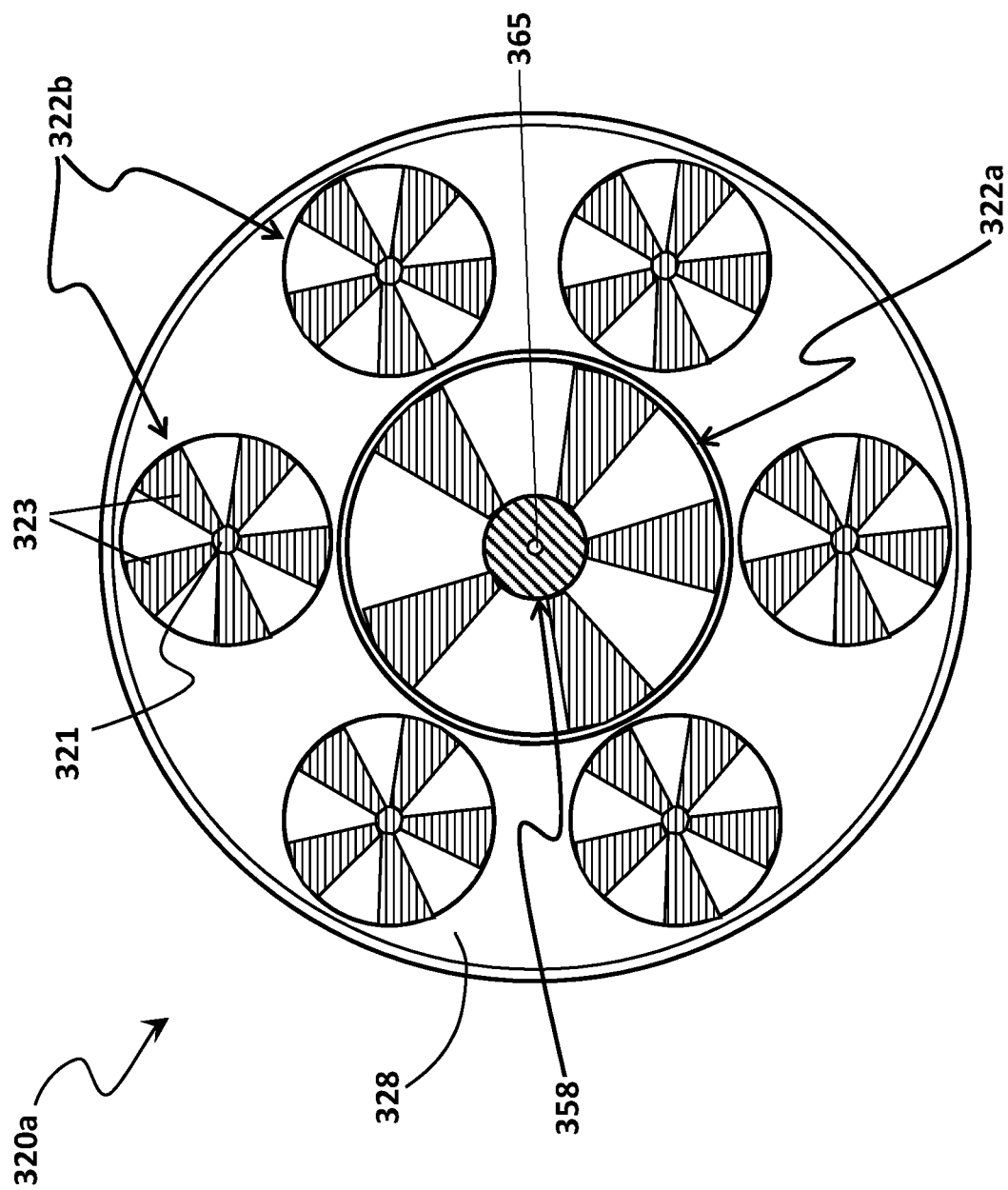
-- FIG. 4 --

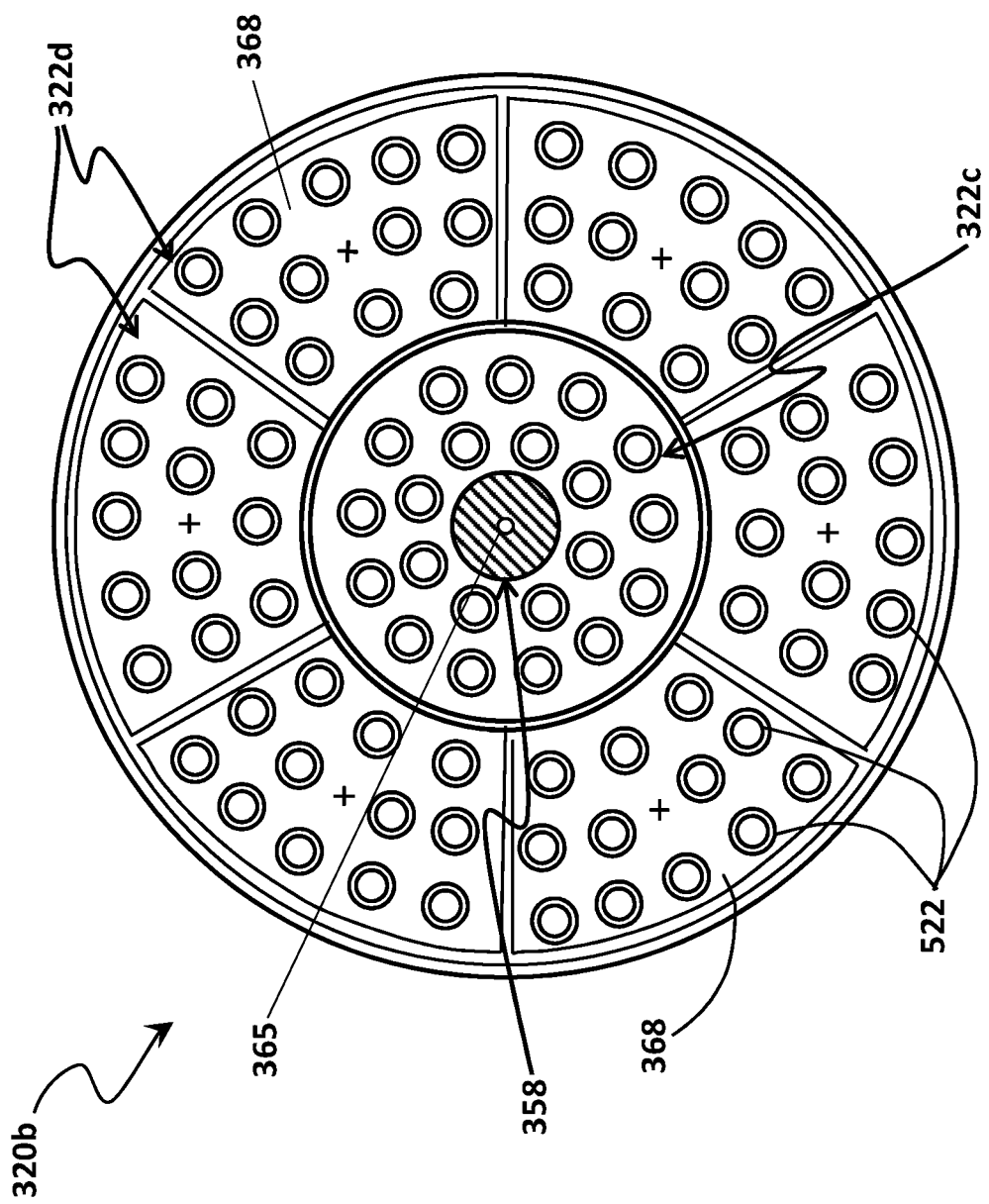
-- FIG. 5 --

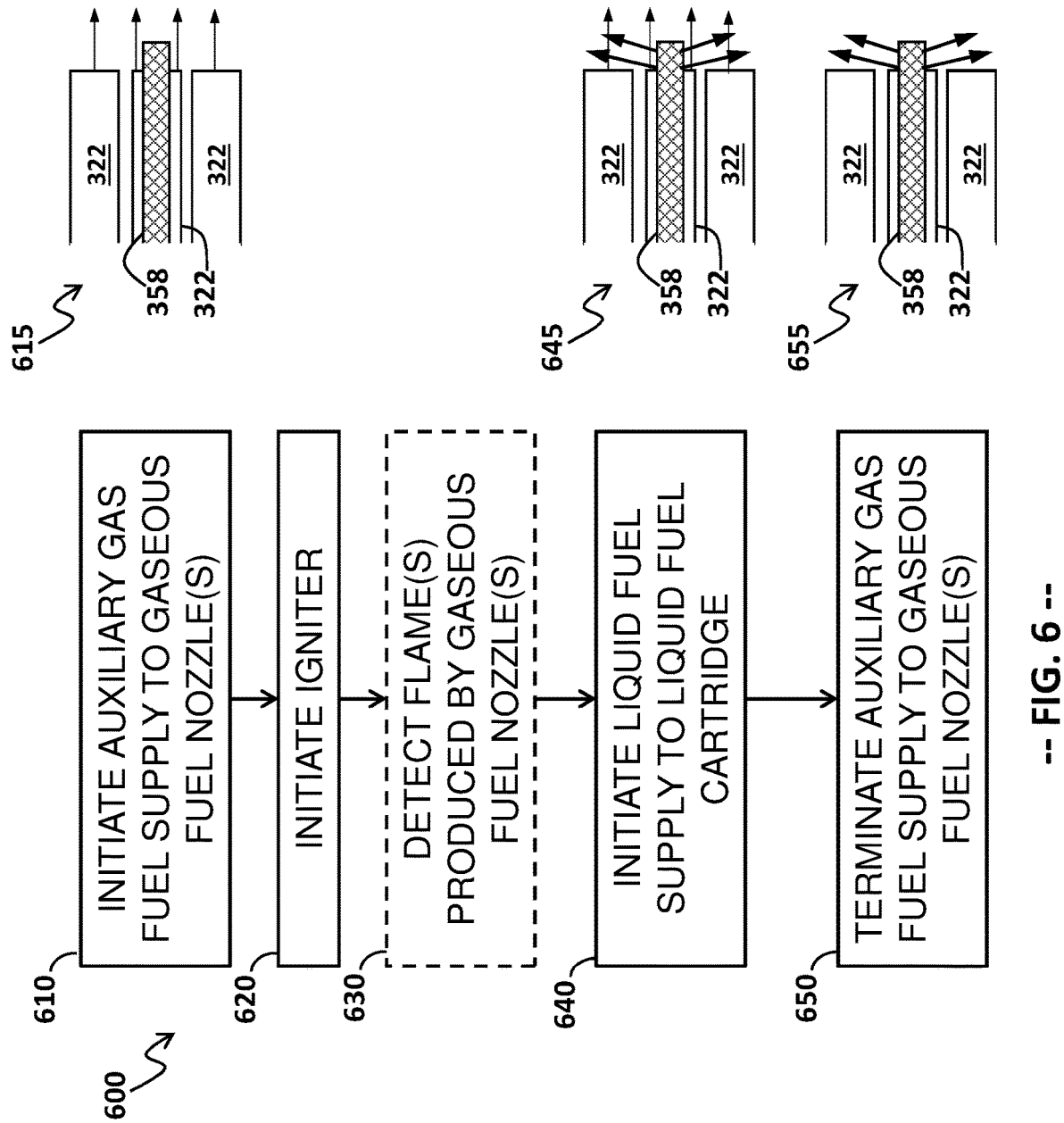

SYSTEM AND METHOD FOR IGNITING LIQUID FUEL IN A GAS TURBINE COMBUSTOR

TECHNICAL FIELD

The present disclosure relates generally to gas turbine combustors and, more particularly, to a system and a method for igniting liquid fuel in gas turbine combustors.

BACKGROUND

A gas turbine generally includes a compressor section, a combustion section having a combustor, and a turbine section. The compressor section progressively increases the pressure of the working fluid to supply a compressed working fluid to the combustion section. The compressed working fluid is routed through a fuel nozzle that extends axially within a forward, or head, end of the combustor. A fuel is combined with the flow of the compressed working fluid to form a combustible mixture. The combustible mixture is burned within a combustion chamber to generate combustion gases having a high temperature, pressure and velocity. The combustion chamber is defined by one or more liners or ducts that define a hot gas path through which the combustion gases are conveyed into the turbine section. In a can-annular type combustion system, multiple combustion cans (each having its own fuel nozzle(s) and liner) produce combustion gases that drive the turbine section.

The combustion gases expand as they flow through the turbine section to produce work. For example, expansion of the combustion gases in the turbine section may rotate a shaft connected to a generator to produce electricity. The turbine may also drive the compressor by means of a common shaft or rotor.

In the combustor section, the fuel nozzles may operate solely on gaseous fuel, solely on liquid fuel, or simultaneously on gaseous fuel and liquid fuel. In many instances, a power-generation plant may experience occasions when it is necessary to operate for a given time using only liquid fuel. In these instances, plant operators have found it convenient to transition from gaseous fuel operation to liquid fuel operation. However, occasions arise during which the primary gaseous fuel supply is unavailable. During these occasions, it has been a challenge to ignite the liquid fuel at start-up without relying on the primary gaseous fuel supply.

One challenge with the ignition of liquid fuel at start-up lies in ensuring the proximity of the igniter to a region of ignitable liquid spray. If the igniter is not sufficiently close to the ignitable liquid spray, ignition will fail to occur. Some legacy ignition systems have relied on a spark igniter positioned within the flame zone and then retracted due to the pressure of the ignited combustion gases. Such spark igniters may experience accelerated wear due to their proximity to the hot combustion gases, particularly if the retraction mechanism fails to perform properly.

A related challenge with the ignition of liquid fuel is the regular production of a high-quality spray of the liquid fuel. Ideally, the liquid fuel spray has a uniformly fine droplet size, and the droplets are spread over a wide area of the combustion zone without reaching the liner walls. In less-than-ideal conditions, the spark igniter may be insufficient for reliable liquid fuel ignition, in instances when the atomized liquid fuel spray may be irregular or may be inadequate to reach the location of the igniter.

Finally, a third challenge with the ignition of liquid fuel occurs in those combustion systems that use cross-fire tubes to propagate a flame among an array of combustion cans. In these systems, if the flammable gases fail to span the width of the combustion can (and thereby enter the cross-fire tubes), proper cross-firing of the combustion cans will fail to occur. This problem may be exacerbated when the liquid fuel is delivered from a centrally located liquid fuel cartridge.

Therefore, an improved system for reliably igniting a liquid fuel in a combustion chamber would be useful, particularly in those circumstances where the power-generating plant may be experiencing a depletion or outage of the primary natural gas supply.

SUMMARY

According to a first aspect, the present disclosure is directed to a system for igniting liquid fuel in a gas turbine combustor is provided. A liquid fuel cartridge, which is located within the head end, is in flow communication with a liquid fuel supply. A gaseous fuel nozzle is located proximate the liquid fuel cartridge and in flow communication with an auxiliary gaseous fuel supply. A controller is in communication with the liquid fuel supply, the auxiliary gaseous fuel supply, and an igniter located proximate or within the head end. The controller is configured to sequentially: initiate a gaseous fuel flow from the auxiliary gaseous fuel supply to the gaseous fuel nozzle; initiate the igniter to combust the gaseous fuel flow; initiate a liquid fuel flow from the liquid fuel supply to the liquid fuel cartridge; and terminate the gaseous fuel flow from the auxiliary gaseous fuel supply.

According to another aspect, a method for igniting a liquid fuel in a gas turbine combustor includes: initiating a flow of gaseous fuel from an auxiliary gaseous fuel supply to at least one gaseous fuel nozzle, the at least one gaseous fuel nozzle located in a head end of the gas turbine combustor; and initiating an igniter to combust the flow of gaseous fuel, the igniter being located proximate or within the head end of the gas turbine combustor. The method further includes: initiating a flow of liquid fuel from a liquid fuel supply to a liquid fuel cartridge, the liquid fuel cartridge being located along a longitudinal axis of the gas turbine combustor; and terminating the flow of gaseous fuel from the auxiliary gaseous fuel supply.

BRIEF DESCRIPTION OF THE DRAWINGS

A full and enabling disclosure of the present products and methods, including the best mode thereof, directed to one of ordinary skill in the art, is set forth in the specification, which refers to the appended figures, in which:

FIG. 2 is a schematic cross-sectional view of a combustor and the present liquid fuel ignition system, which may be used in the gas turbine assembly of FIG. 1;

FIG. 3 is a side view of a liquid fuel cartridge, as may be used in the combustor of FIG. 2;

FIG. 4 is a plan view of a first embodiment of a combustor head end, in which the liquid fuel cartridge of FIG. 3 is installed;

FIG. 5 is a plan view of a second embodiment of a combustor head end, in which the liquid fuel cartridge of FIG. 3 is installed; and FIG. 6 is a flow chart of a method of igniting a liquid fuel in a gas turbine combustor, according to another aspect of the present disclosure, the flow chart including schematic diagrams to illustrate respective flows from fuel nozzles of the combustor of FIG. 2.

DETAILED DESCRIPTION

Figure 1:
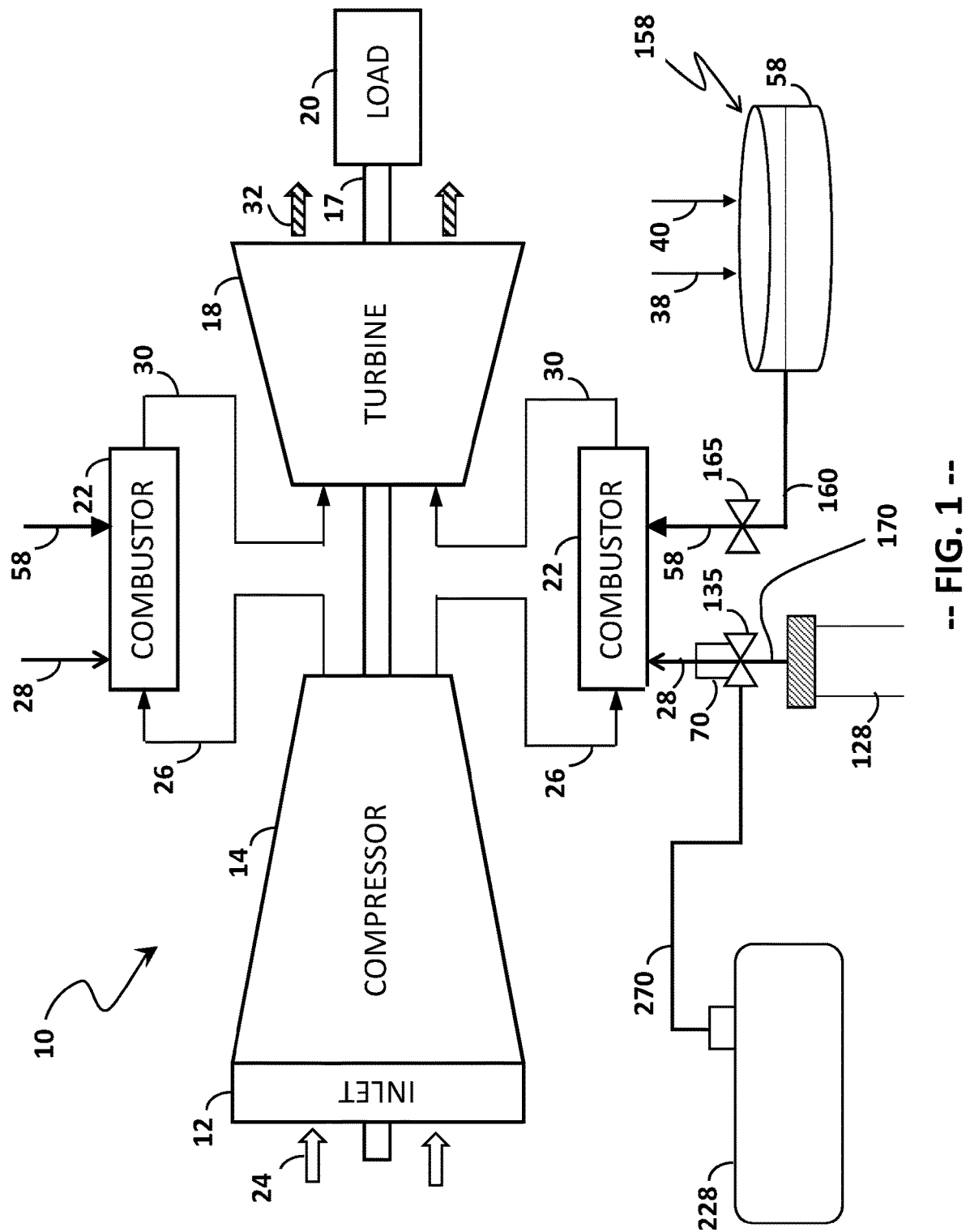
FIG. 1 is a schematic diagram of a gas turbine assembly, which may employ a liquid fuel ignition system, as described herein.

The following detailed description illustrates a gas turbine combustor, a system for igniting liquid fuel in the gas turbine combustor, and a method of igniting liquid fuel in a gas turbine combustor, by way of example and not limitation. The description enables one of ordinary skill in the art to make and use the liquid fuel ignition system. The description provides several embodiments of the combustor cap assembly and includes what is presently believed to be the best modes of making and using the present liquid fuel ignition system. An exemplary liquid fuel injection system is described herein as being coupled to a combustor of a heavy-duty gas turbine assembly used for electrical power generation. However, it is contemplated that the liquid fuel injection system described herein may have general application to a broad range of systems in a variety of fields other than electrical power generation.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The term "radially" refers to the relative direction that is substantially perpendicular to an axial centerline of a particular component, and the term "axially" refers to the relative direction that is substantially parallel to an axial centerline of a particular component. As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

Each example is provided by way of explanation, not limitation of the invention. In fact, it will be apparent to those skilled in the art that modifications and variations can be made in the present liquid fuel injection system, without departing from the scope or spirit of the present disclosure. For instance, features illustrated or described as part of one embodiment may be used on another embodiment to yield a still further embodiment. Thus, it is intended that the present disclosure encompasses such modifications and variations as fall within the scope of the appended claims and their equivalents. Although exemplary embodiments of the present liquid fuel injection system and method will be described generally in the context of a combustor incorporated into a gas turbine for purposes of illustration, one of ordinary skill in the art will readily appreciate that embodiments of the present disclosure may be applied to any combustor incorporated into any turbomachine and is not limited to a gas turbine combustor, unless specifically recited in the claims.

Reference will now be made in detail to various embodiments of the present liquid fuel injection system and method, one or more examples of which are illustrated in the accompanying drawings. The detailed description uses numerical and letter designations to refer to features in the drawings. Like or similar designations in the drawings and description have been used to refer to like or similar parts.

FIG. 1 provides a functional block diagram of an exemplary gas turbine 10 that may incorporate various embodiments of the present disclosure. As shown, the gas turbine 10 generally includes an inlet section 12 that may include a series of filters, cooling coils, moisture separators, and/or other devices to purify and otherwise condition a working fluid (e.g., air) 24 entering the gas turbine 10. The working fluid 24 flows to a compressor section where a compressor 14 progressively imparts kinetic energy to the working fluid 24 to produce a compressed working fluid 26.

The compressed working fluid 26 is mixed with a gaseous fuel 28 or a liquid fuel mixture 58 to form a combustible mixture within one or more combustors 22 of a combustion section or system 16. The gaseous fuel 28 may originate from a main gaseous fuel supply system 128 (such as a gaseous fuel pipeline), via a main gaseous fuel supply line 170, or from an auxiliary gaseous fuel supply 228 (such as a storage tank), via an auxiliary gaseous fuel supply line 270. For convenience, a gaseous fuel supply valve 135 may be positioned in fluid communication with the main gaseous fuel supply line 170 and the auxiliary gaseous fuel supply line 270, such that gaseous fuel 28 is delivered from a single source (either the main gaseous fuel supply system 128 or the auxiliary gaseous fuel supply system 228). The liquid fuel mixture 58 originates from a liquid fuel supply system 158 (such as a mixing tank) within which liquid fuel 38 and water 40 are mixed and is delivered to the combustor 22 via a liquid fuel supply line 160. A liquid fuel supply valve 165 controls the delivery of the liquid fuel 58.

The combustible mixture—whether gaseous and/or liquid fuel—is burned to produce combustion gases 30 having a high temperature, pressure, and velocity. The combustion gases 30 flow through a turbine 18 of a turbine section to produce work. For example, the turbine 18 may be connected to a shaft 17 so that rotation of the turbine 18 drives the compressor 14 to produce the compressed working fluid 26. Alternately or in addition, the shaft 17 may connect the turbine 18 to a generator 20 for producing electricity.

Exhaust gases 32 from the turbine 18 flow through an exhaust section (not shown) that connects the turbine 18 to an exhaust stack downstream from the turbine. The exhaust section may include, for example, a heat recovery steam generator (not shown) for cleaning and extracting additional heat from the exhaust gases 32 prior to release to the environment.

The combustors 22 may be any type of combustor known in the art, and the present invention is not limited to any particular combustor design unless specifically recited in the claims. For example, the combustor 22 may be a can type or a can-annular type of combustor.

FIG. 2 is a schematic representation of a combustion can 22, as may be included in a can annular combustion system 16 for the heavy-duty gas turbine 10. In a can annular combustion system 16, a plurality of combustion cans 22 (e.g., 8, 10, 12, 14, 16, or more) are positioned in an annular array about the shaft 17 that connects the compressor 14 to the turbine 18.

As shown in FIG. 2, the combustion can 22 includes a liner 312 that contains and conveys combustion gases 30 to the turbine. The liner 312 defines a combustion chamber within which combustion occurs. The liner 312 may have a cylindrical liner portion and a tapered transition portion that is separate from the cylindrical liner portion, as in many conventional combustion systems. Alternately, the liner 312 may have a unified body (or "unibody") construction, in which the cylindrical portion and the tapered portion are integrated with one another. Thus, any discussion of the liner 312 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The liner 312 is surrounded by an outer sleeve 314, which is spaced radially outward of the liner 312 to define an annulus 332 between the liner 312 and the outer sleeve 314. The outer sleeve 314 may include a flow sleeve portion at the forward end and an impingement sleeve portion at the aft end, as in many conventional combustion systems. Alternately, the outer sleeve 314 may have a unified body (or "unisleeve") construction, in which the flow sleeve portion and the impingement sleeve portion are integrated with one another in the axial direction. As before, any discussion of the outer sleeve 314 herein is intended to encompass both convention combustion systems having a separate flow sleeve and impingement sleeve and combustion systems having a unisleeve outer sleeve.

A head end portion 320 of the combustion can 22 includes one or more fuel nozzles 322. The fuel nozzles 322 have a fuel inlet 324 at an upstream (or inlet) end. The fuel inlets 324 may be formed through an end cover 326 at a forward end of the combustion can 22. The downstream (or outlet) ends of the fuel nozzles 322 extend through a combustor cap 328 (also shown in FIG. 4) or include an aft plate 368 that functions as a cap (as shown in FIG. 5).

The head end portion 320 of the combustion can 22 is at least partially surrounded by a forward casing, which is physically coupled and fluidly connected to a compressor discharge case. The compressor discharge case is fluidly connected to an outlet of the compressor 14 and defines a pressurized air plenum that surrounds at least a portion of the combustion can 22. Air 26 flows from the compressor discharge case into the annulus 332 at an aft end of the combustion can, via openings defined in the outer sleeve 314. Because the annulus 332 is fluidly coupled to the head end portion 320, the air flow 26 travels upstream from the aft end of the combustion can 22 to the head end portion 320, where the air flow 26 reverses direction and enters the fuel nozzles 322.

Fuel 28 and compressed air 26 are introduced by the fuel nozzles 322 into a combustion zone 350 at a forward end of the liner 312, where the fuel 28 and air 26 are ignited, via an igniter 370, and combusted to form combustion gases 30. The igniter 370 is positioned proximate the head end 320 of the combustion can 22. Alternately, the igniter may be a torch-style igniter 380 positioned within the head end 320 of the combustion can 22 (for example, through the end cover 326 upstream of one of the fuel nozzles 322). The combustion gases 30 from one combustion can 22 travel through cross-fire tubes (not shown) between the liners 312 of adjacent combustion cans 22 to propagate the flame around the array of combustion cans 22.

In one embodiment, the fuel 28 and air 26 are mixed within the fuel nozzles 322 (e.g., in a premixed fuel nozzle). In other embodiments, the fuel 28 and air 26 may be separately introduced into the combustion zone 350 and mixed within the combustion zone 350 (e.g., as may occur with a diffusion nozzle). Reference made herein to a "fuel/air mixture" should be interpreted as describing both a premixed fuel/air mixture and a diffusion-type fuel/air mixture, either of which may be produced by the fuel nozzles 322.

In the case of liquid fuel operation, a liquid fuel mixture 58 is delivered via the liquid fuel supply line 160 to a liquid fuel cartridge 358. In an exemplary embodiment, the liquid fuel cartridge 358 is installed along a longitudinal axis, or center line, 310 of the combustion can 22, and is disposed co-axially within one of the fuel nozzles 322.

The combustion gases 30, which are produced by combusting gaseous fuel 28 and/or liquid fuel 58 with compressed air 26, travel downstream toward an aft end 318 of the combustion can 22, the aft end 318 being represented by an aft frame of the combustion can 22. The combustion gases 30 exit the combustor section 16 and enter the turbine 18, as described above.

A control system, or controller, 400 is used to control the fuel 28, 58 provided to the combustion can 22. The control system 400 is in communication, via a signal 435, with the gaseous fuel supply valve 135, which is disposed along the main gaseous fuel supply line 170 and the auxiliary gaseous fuel supply line 270, such that gaseous fuel 28 is directed from one of these supply lines 170 or 270, through the valve 135, and into the gaseous fuel supply line 70. The control system 400 is also in communication, via a signal 465, with the liquid fuel supply valve 165, which is disposed along the liquid fuel supply line 160. In one embodiment, the control system 400 transmits an initiation signal 470 to the igniter 370 during start-up of the combustion can 22. In an alternate embodiment, the control system 400 transmits an initiation signal 480 to the torch-style igniter 380 during start-up of the combustion system.

A flame detector 412 or 414 (labeled "S" in FIG. 2 to represent a sensor) may be used to detect a flame within the combustion zone 350. The flame detector 412 is disposed within, or through, the end cover 326 and is positioned to detect a flame in the combustion zone 350, as viewed through the upstream end of the fuel nozzle 322. The flame detector 414 may be disposed along an interior surface of the liner 312 and positioned to detect a flame in the combustion zone 350, as viewed from a downstream end of the combustor 22 looking upstream toward the head end 320. The flame detector 412 or 414 is in communication with the controller 400, such that the detection of the flame is transmitted as a signal 422, 424 to the controller 400. The flame detector 412, 414 may be any type of flame detector known in the art, including, but not limited to, an optical detector, a spectrometer, a camera, an ultraviolet flame detector, an infrared flame detector, a thermal detector, a pressure sensor, or a combination thereof.

FIG. 3 illustrates the liquid fuel cartridge 358, as may be used with the combustion can 22 of FIG. 2. The liquid fuel cartridge 358 includes a cylindrical body 360, a liquid fuel cartridge tip 362, and a mounting flange 366 that defines an inlet 364 that receives the liquid fuel mixture 58 from the liquid fuel supply line 160. The cartridge tip 362 includes one or more rows of liquid fuel injection holes 364 that circumscribe the cartridge tip 362. The liquid fuel injection holes 364 deliver the liquid fuel mixture 58 in a direction transverse to the delivery of the fuel/air mixture from the fuel nozzles 322 (as shown in FIG. 6). The cartridge tip 362 includes a downstream surface 363, which may optionally define therethrough one or more liquid fuel injection holes 365, which deliver the liquid fuel mixture 58 in a direction parallel to the delivery of the fuel/air mixture from the fuel nozzles 322.

FIG. 4 is a plan view of a first embodiment of a combustor head end 320a, in which the liquid fuel cartridge 358 of FIG. 3 is installed. In this embodiment, the liquid fuel cartridge 358 is installed within a central fuel nozzle 322a, such as a swirling fuel nozzle or swozzle. The central fuel nozzle 322a is surrounded by a plurality of outer fuel nozzles 322b, which may also be swirling fuel nozzles or swozzles. Each swozzle 322a, 322b includes swirling vanes 323 that impart a swirling direction to air flowing therethrough. In the case of the outer swozzles 322b, the swirling vanes 323 are disposed about a central hub 321, while the swirling vanes 323 in the central swozzle 322a are disposed about the liquid fuel cartridge 358. Although six outer fuel nozzles 322b are shown, it should be understood that other numbers of fuel nozzles 322b may be employed (such as 4, 5, or 8 fuel nozzles 322b). The fuel nozzles 322a, 322b are installed within corresponding openings (not separately labeled) in the combustor cap 328.

FIG. 5 is a plan view of a second embodiment of a combustor head end 320b, in which the liquid fuel cartridge 358 of FIG. 3 is installed. In this embodiment, the liquid fuel cartridge 358 is installed within a center fuel nozzle 322c, such as a bundled tube fuel nozzle. The center fuel nozzle 322c is surrounded by a plurality of fuel nozzles 322d, which may also be bundled tube fuel nozzles. Each bundled tube fuel nozzle 322c, 322d includes a plurality of individual premixing tubes 522 within which fuel and air are mixed. The premixing tubes 522 extend through an aft plate 368, which may be unique to each bundled tube fuel nozzle 322c, 322d, or which may extend across all the bundled tube fuel nozzles 322c, 322d.

The bundled tube fuel nozzles 322c, 322d may include an upstream fuel plenum unique to each fuel nozzle 322c, 322d, and each premixing tube 522 may include one or more fuel injection ports in fluid communication with the fuel plenum. Air flowing through an inlet end of each premixing tube 522 mixes with fuel flowing through the fuel injection port(s), and a mixture of fuel and air is conveyed through an outlet end of each tube 522.

Alternately, each premixing tube 522 may include an inlet end in which a fuel lance is installed. A plurality of air inlet holes is disposed downstream of the fuel lance, such that air flowing through the air inlet holes is mixed with fuel from the fuel lance. A mixture of fuel and air is conveyed through the outlet end of each tube 522.

Although the bundled tube fuel nozzles 322d are shown as having a sector shape having two radially extending sides and two oppositely disposed arcuate sides, it should be understood that the bundled tube fuel nozzles 322d may have any shape or size relative to the center bundled tube fuel nozzle 322c.

FIG. 6 is a flow chart of a sequential set of steps 610 through 650, which define a method 600 of igniting a liquid fuel in a gas turbine combustor, according to another aspect of the present disclosure. The flow chart includes schematic diagrams to illustrate respective flows from the fuel nozzles 322 and the liquid fuel cartridge 358 of the combustor can 22 of FIG. 2.

In step 610, the controller 400 initiates an auxiliary gas fuel supply to the gaseous fuel nozzles 322 by transmitting the signal 435 to the gaseous fuel supply valve 135. The gaseous fuel supply valve 135 opens a passage between the auxiliary gaseous fuel supply line 270 and the gaseous fuel supply line 70, which leads to the gaseous fuel nozzles 322, while simultaneously closing a passage between the main gaseous fuel supply line 170 and the gaseous fuel supply line 70. As a result, a gaseous fuel/air mixture is delivered from the gaseous fuel nozzles 322, as shown in the schematic diagram 615.

In step 620, the controller 400 initiates the igniter 370 by transmitting a signal 470 to the igniter 370. The igniter 370 generates a spark that ignites the gaseous fuel/air mixture within the combustion zone 350.

Optionally, in step 630, the controller 400 receives a feedback signal 422 or 424 from the flame detector 412 or 414, respectively, which indicates that a flame from the ignition of the gaseous fuel/air mixture has been detected in the combustion zone 350.

In step 640, the controller 400 initiates the liquid fuel supply to the liquid fuel cartridge 358 by transmitting the signal 465 to the liquid fuel supply valve 165. The liquid fuel supply valve 165 opens a passage between the liquid fuel supply line extending from the liquid fuel supply system 158, or reservoir, and the liquid fuel supply line extending to the liquid fuel cartridge 358. As a result, a liquid fuel mixture is delivered from the liquid fuel cartridge 358 in one or more directions transverse to the axial direction of the gaseous fuel/air mixture being delivered from the gaseous fuel nozzles 322, as shown in the schematic diagram 645. The controller 400 may initiate step 640 based on a time sequence or based upon receipt of the signal 422 or 424, if step 630 is included.

In step 650, the controller 400 terminates the auxiliary gaseous fuel supply to the gaseous fuel nozzles 322 by transmitting a second signal 435 to the gaseous fuel supply valve 135. The gaseous fuel supply valve 135 closes a passage between the gaseous fuel supply line 270 and the gaseous fuel supply line 70. The passage between the gaseous fuel supply line 170 and the gaseous fuel supply line 70 also remains closed, such that no gaseous fuel is permitted to travel through gaseous fuel supply line 70 to the gaseous fuel nozzles 322. As a result, the liquid fuel mixture is delivered from the liquid fuel cartridge 358, and the gaseous fuel cartridges 322 are unfueled (i.e., may deliver air only), as shown in schematic diagram 655.

Thus, within a matter of tens of seconds (for example, less than a minute), the combustion can 122 may be successfully started on gaseous fuel and transitioned to liquid fuel operation. With such rapid and efficient transfer to liquid fuel operation, multiple starts may be accomplished from a single gaseous fuel tank 228, thereby providing greater operational flexibility to the plant operator.

The methods and systems described herein facilitate the ignition of liquid fuel in a gas turbine combustor. More specifically, the methods and systems facilitate igniting liquid fuel without access to a primary gaseous fuel supply. The methods and systems therefore facilitate improving the overall operating flexibility of a combustor such as, for example, a combustor in a turbine assembly. This may reduce the costs associated with operating a combustor such as, for example, a combustor in a turbine assembly and/or increase the operational hours (and output) of the combustor.

Exemplary embodiments of liquid fuel ignition system and method are described above in detail. The method and systems described herein are not limited to the specific embodiments described herein, but rather, components of the method and systems may be utilized independently and separately from other components described herein. For example, the method and systems described herein may have other applications not limited to practice with turbine assemblies, as described herein. Rather, the method and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A system for igniting liquid fuel in a gas turbine combustor, the system comprising:
   a combustor having a longitudinal axis and a head end;
   a liquid fuel cartridge located within the head end co-axial with the longitudinal axis, the liquid fuel cartridge being in flow communication with a liquid fuel supply;
   at least one gaseous fuel nozzle in close proximity to the liquid fuel cartridge;
   a primary gaseous fuel supply in flow communication with the at least one gaseous fuel nozzle;
   an auxiliary gaseous fuel supply in flow communication with the at least one gaseous fuel nozzle;
   an igniter positioned proximate or within the head end of the combustor; and
   a controller in communication with the igniter, the liquid fuel supply, and the auxiliary gaseous fuel supply, the controller being configured to sequentially:
      initiate a flow of gaseous fuel from the auxiliary gaseous fuel supply to the at least one gaseous fuel nozzle;
      initiate the igniter to combust the flow of gaseous fuel from the auxiliary gaseous fuel supply;
      initiate a flow of liquid fuel from the liquid fuel supply to the liquid fuel cartridge; and
      terminate the flow of gaseous fuel from the auxiliary gaseous fuel supply.

2. The system of claim 1, wherein the liquid fuel supply comprises a vessel containing a mixture of liquid fuel and water.

3. The system of claim 1, wherein the liquid fuel cartridge comprises a tip for injection of liquid fuel, the tip of the liquid fuel cartridge being axially downstream of an outlet of the at least one gaseous fuel nozzle.

4. The system of claim 3, wherein the tip of the liquid fuel cartridge comprises a plurality of fuel injection ports along a circumferential surface thereof, the plurality of fuel injection ports delivering liquid fuel in a radial direction relative to the longitudinal axis of the combustor.

5. The system of claim 1, wherein the auxiliary gaseous fuel supply comprises a storage tank.

6. The system of claim 1, further comprising a flame detector located within the combustor for detecting a flame emanating from the at least one gaseous fuel nozzle, the flame detector being in communication with the controller.

7. The system of claim 1, wherein the at least one gaseous fuel nozzle comprises a plurality of gaseous fuel nozzles.

8. The system of claim 1, further comprising an auxiliary gaseous fuel supply line extending from the auxiliary gaseous fuel supply; and further comprising a gaseous fuel valve located along the auxiliary gaseous fuel supply line, the gaseous fuel valve being in communication with the controller.

9. The system of claim 8, further comprising a main gaseous fuel supply in flow communication with the at least one gaseous fuel nozzle.

10. The system of claim 8, further comprising a main gaseous fuel supply line extending from the main gaseous fuel supply; wherein the main gaseous fuel supply line further comprises the gaseous fuel valve.

11. The system of claim 10, further comprising a gaseous fuel delivery line extending between the gaseous fuel valve and the at least one gaseous fuel nozzle.

12. A method of igniting liquid fuel in a gas turbine combustor, the method comprising:
   initiating a flow of gaseous fuel from only an auxiliary gaseous fuel supply to at least one gaseous fuel nozzle, the at least one gaseous fuel nozzle located in a head end of the gas turbine combustor and in fluid communication with a primary gaseous fuel supply and an auxiliary gaseous fuel supply;
   initiating an igniter to combust the flow of gaseous fuel from only the auxiliary gaseous fuel supply, the igniter being located proximate or within the head end of the gas turbine combustor;
   initiating a flow of liquid fuel from a liquid fuel supply to a liquid fuel cartridge, the liquid fuel cartridge being located along a longitudinal axis of the gas turbine combustor; and
   terminating the flow of gaseous fuel from the auxiliary gaseous fuel supply.

13. The method of claim 12, further comprising providing a controller in communication with the igniter, the auxiliary gaseous fuel supply, and the liquid fuel supply.

14. The method of claim 12, further comprising providing a flame detector within the combustor for detecting a flame emanating from the at least one gaseous fuel nozzle, the flame detector being in communication with the controller.

15. The method of claim 14, wherein the initiating a flow of liquid fuel occurs after the flame detector detects a flame in the head end.

16. The method of claim 12, further comprising providing a mixture of liquid fuel and water via the liquid fuel supply.

17. The method of claim 12, wherein the initiating the flow of gaseous fuel from only the auxiliary gaseous fuel supply is accomplished by controlling a gaseous fuel valve located in an auxiliary gaseous fuel supply line extending from the auxiliary gaseous fuel supply.

18. The method of claim 17, wherein the terminating the flow of gaseous fuel from the auxiliary gaseous fuel supply is accomplished by controlling the gaseous fuel valve.

19. The method of claim 12, wherein the initiating the flow of liquid fuel form a liquid fuel supply is accomplished by controlling a liquid fuel valve located in a liquid fuel supply line extending between the liquid fuel supply and the liquid fuel cartridge.

* * * * *